US006732852B2

(12) United States Patent
Kilabards et al.

(10) Patent No.: US 6,732,852 B2
(45) Date of Patent: May 11, 2004

(54) TRUNNION MOUNTABLE FIXTURE (75) Inventors: Velibor Kilabards, Birmingham, MI (US); Michael R. Dugas, Brighton, MI (US); Alan S. Kaufman, White Lake Township, MI (US); Karl G. Johnson, New Hudson, MI (US)

(73) Assignee: Progressive Tool & Industries Co., Southfield, MI (US)

( * ) Notice: Subject to any disclaimer, the term of this patent is extended or adjusted under 35 U.S.C. 154(b) by 2 days.

(21) Appl. No.: 09/987,827

(22) Filed: Nov. 16, 2001

(65) Prior Publication Data
US 2002/0092729 A1 Jul. 18, 2002

Related U.S. Application Data
(60) Provisional application No. 60/262,566, filed on Jan. 18, 2001.

(51) Int. Cl.[7] .................................................. B65G 47/34
(52) U.S. Cl. ............................... 198/465.4; 198/465.1; 198/867.13
(58) Field of Search .......................... 198/465.1, 465.4, 198/474.1, 680, 377.02, 687.1, 377.07, 379, 867.13, 377.03

(56) References Cited

U.S. PATENT DOCUMENTS

| 2,598,163 | A | * | 5/1952 | Halls | 198/377.1 |
| 2,657,666 | A | * | 11/1953 | Fowler | 198/379 |
| 3,166,785 | A | * | 1/1965 | Lemmond | 198/465.4 |
| 6,557,690 | B2 | * | 5/2003 | Oldford et al. | 198/465.4 |

* cited by examiner

Primary Examiner—Joseph E. Valenza
(74) Attorney, Agent, or Firm—Young & Basile, P.C.

(57) ABSTRACT

A rotatable frame mounted on a base with trunnions. The frame can support a workpiece on more than one surface and can have workpiece engaging devices such as clamps, locating pins or nesting fixtures on both sides. The engaging devices can be different on different sides of the frame. The frame can be rotated by an electric motor, a pneumatic motor or a hydraulic motor. The frame can be expandable to accommodate frames of different sizes. The workstation can have a plurality of trunnion mounted fixtures positioned next to each other and a robot moveable between the fixtures. The frames can be replaced with a lifting device moving along an overhead rail. The frame includes an aperture positioned along the rotational axis of the frame for communicating power from an external power source to workpiece engaging devices.

20 Claims, 6 Drawing Sheets

TRUNNION MOUNTABLE FIXTURE

CROSS REFERENCE TO RELATED APPLICATIONS

This application claims the benefit of the provisional patent application 60/262,566 for a TRUNNION MOUNTABLE FIXTURE, filed on Jan. 18, 2001. This claim is made under 35 U.S.C. § 119(e) and 37 C.F.R. § 1.53(c)(3).

FIELD OF THE INVENTION

The invention relates to an apparatus for retaining a workpiece during a processing operation, and more specifically, the invention provides a rotatable fixture mounted on a trunnion.

BACKGROUND OF THE INVENTION

It has been a problem that current configurations of automobile manufacturing workstations are not as flexible desired. These current configurations cannot be changed to accommodate different configurations or workpieces without substantially effecting the production rate of the workstation. Generally, known workstations require production to be shutdown for an excessive amount of time in order to accomplish a changeover to a different workpiece configuration.

SUMMARY OF THE INVENTION

It would be desirable to provide a workstation having improved flexibility and reduced changeover time. The present invention provides an apparatus for engaging a workpiece during a processing operation. The apparatus includes a rotatable, removable frame for retaining the workpiece, a base for supporting the frame, and a rotary drive for rotating the frame relative to the base. The frame has at least two surfaces for retaining workpieces. Each surface can include workpiece retaining devices such as clamps, locating pins, or nesting fixtures. The frame can also include rings positioned along the perimeter of the frame for lifting the frame out of the trunnion. The frame also includes an aperture for receiving pneumatic or electrical connections for power and/or control functions from an external source. The base includes support posts connected to a base, and cross members. Each support post includes a yoke and rollers for operably supporting the frame. The frame is supported in the yoke. Rollers can be positioned with respect to the yoke to support the frame by engaging the trunnion for rotation with respect to the yoke. The rotary drive can be mounted directly to the base or can include an external rotary power source. The rotary drive can include gears mounted on the frame and mounted on the base.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED EMBODIMENT

The present invention provides a trunnion mountable fixture 10 for engaging a workpiece during a processing operation. The trunnion mountable fixture includes a pivotable frame 12, a trunnion 14 connected to the pivotal frame for rotation therewith, and a rotary drive 16. The trunnion 14 is connected to the frame 12 and is supported in the cradle or yoke 40 of base frame 8. The rotary drive 16 rotates the pivotal frame 12 reciprocally through a predetermined angular movement by driving the trunnion 14 relative to the base frame 8.

Figure 1:
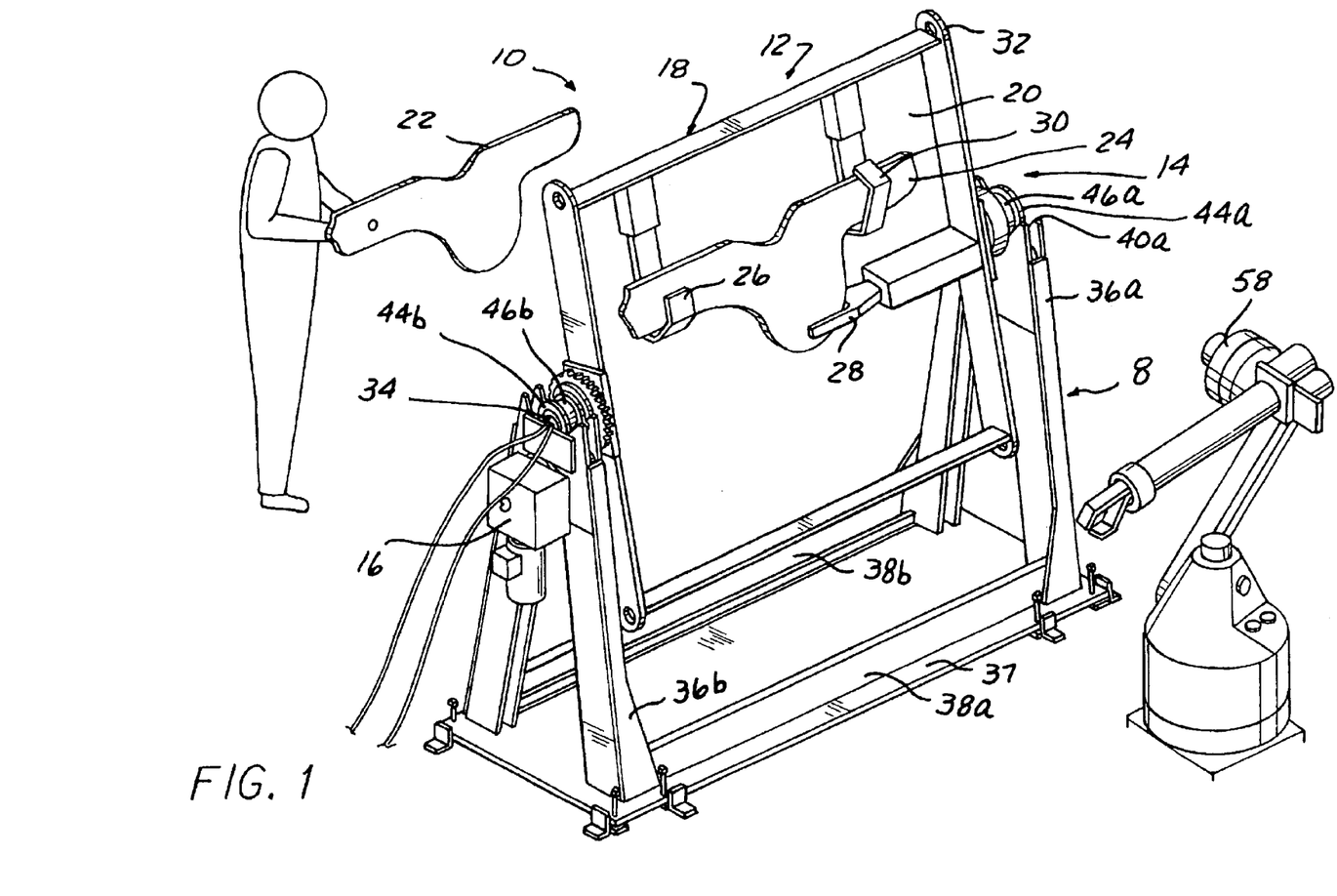
FIG. 1 is a perspective view of a trunnion assembly according to the present invention.

The pivotal frame 12 includes at least two faces for engaging workpieces, a first face 18 and a second face 20. Alternatively, the pivotal frame 12 can include at least two plates 94a and 94b, shown in FIG. 9. The plates 94a and 94b can partially or completely extend between the outer frame members. The pivotal frame can support clamps, sensors and the like at desired locations. A workpiece can be supported from each face of the frame 12. For example, a workpiece 22 can be transferred to the first surface 18, as shown in FIG. 1. One or more workpiece engaging devices can be positioned relative to the face 18 and face 20 to support the workpiece 22 on one face, while a workpiece 24 is supported on an opposite face. Workpiece engaging devices can be positioned on a plate 94a and 94b to support a first workpiece relative to one face, while another workpiece is supported relative to another face. A workpiece engaging device can take the form of a nesting fixture 26, a locating pin 28, or a clamp 30. Both the first face 18 and second face 20 can be fitted with similar workpiece engaging devices, or with different configurations of devices. For example, a locating pin 28a can be positioned on the first face 18 and a clamp 30 and locating pin 28 can be positioned on the second face 20. The frame 12 can also include rings 32 preferably located at outer ends of the pivotal frame. The rings 32 can provide a location to engage the frame 12 with a lifting device. The frame 12 can be lifted up and away from the base frame 8. The frame 12 also includes an aperture 34 extending through the trunnion 14. Electric or pneumatic power and/or controls for the workpiece engaging devices can be directed through the aperture 34. For example, electric power for an electric clamp 30 can be connected through a manual coupling, or a quick connect coupling, in the aperture 34, or adjacent thereto, to provide communication with an external power source. Fluid conduits, such as pneumatic or hydraulic lines, can also be directed through the aperture 34 with the use of manual couplings or quick connect couplings.

The base frame 8 includes support members 36a and 36b connected to cross members 38a and 38b. The support members 36a and 36b can be associated with a base 37. The support members 36a and 36b can be releasibly connected to the cross members 38a and 38b. The base frame 8 also includes a cradle or yoke 40 for supporting the trunnion of the pivotal frame 12. The yokes 40a and 40b are formed at the upper ends of support members 36a and 36b. The base frame 8 can also be extendable to increase the distance between support members 36a and 36b. The support members 36a and 36b can be releasibly associated with a base 37. Cross members 38a and 38b can include a plurality of members slidably associated with each other between lockable positions to accommodate expansion of the base frame 8. An expandable base frame 8 can be operable to receive a plurality of different sized pivotal frames 12.

The pivotal frame 12 is supported by the base frame 8. The trunnions of the pivotal frame include guide spools 44a and 44b for supporting the weight of the pivotal frame 12 and workpieces connected thereto through the base frame 8.

Figure 3:
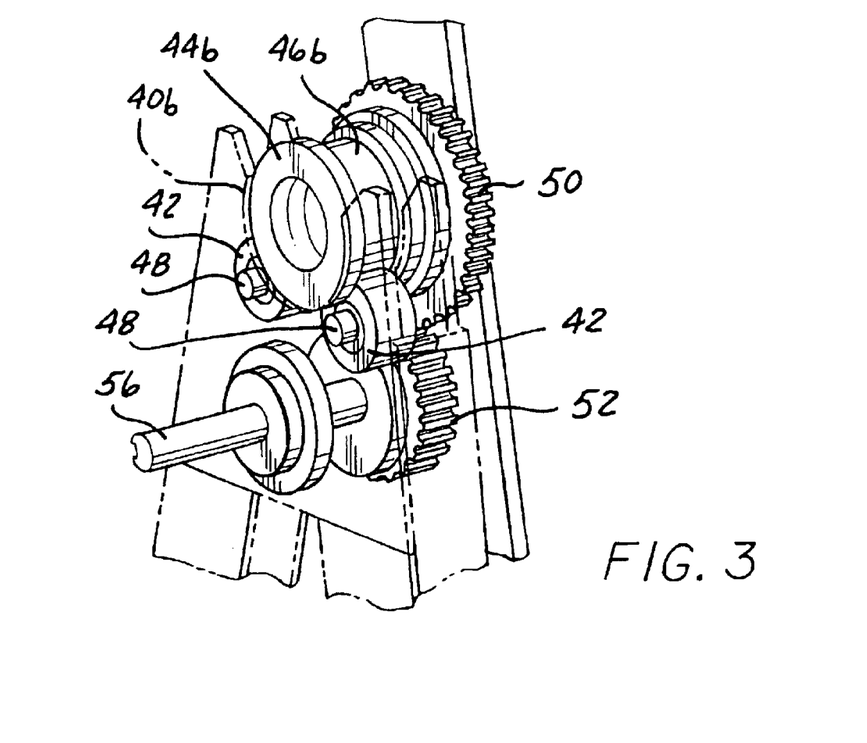
FIG. 3 is a cut-away view showing the support of the frame by the trunnion and showing the rotary drive driven by an external power source.

The guide spools 44a and 44b are sized to fit within the yokes 40a and 40b so that the enlarged outer diameters resist lateral shifting of the frame with respect to the pivotal axis of the trunnion while resting in the cradle of the base frame 8. The base frame 8 can also include rollers 42 engageable with each guide spool 44a and 44b to rollingly engage within recessed portions 46a and 46b to promote rotational movement between the trunnion fixedly connected to the pivotal frame 12 relative to the base frame 8. The recessed portions 46a and 46b can be of appropriate shape and size to correspond to the rollers 42. The rollers 42 can be mounted on the base frame 8 with shafts 48 adjacent to the cradle or yokes 40a and 40b.

Figure 2:
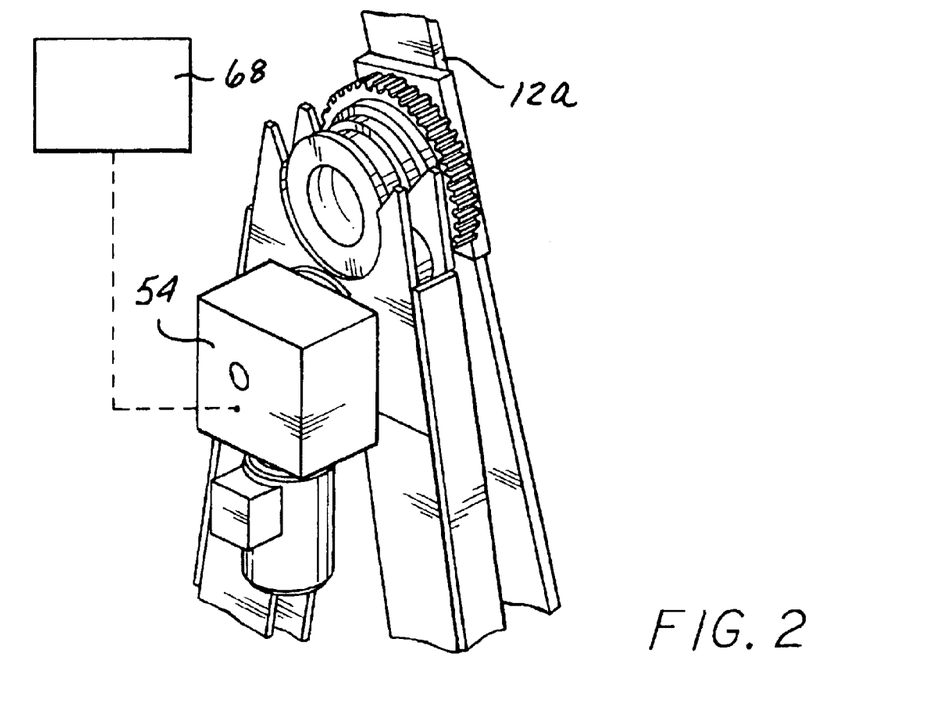
FIG. 2 is a detail view of a rotary drive mounted directly on the base.

The rotary drive 16 rotates the pivotal frame 12 relative to the base frame 8. In operation, the rotary drive 16a rotates the pivotal frame 12 in either rotational direction until the support member 36c engages a stop 49, shown in FIG. 9, connected to frame 12. The rotary drive 16a continues to provide a low level of torque to maintain the pivotal frame in stationary engagement with stop 49 in a ready position. The rotary drive can include a gear 50 fixedly mounted on the trunnion of the pivotal frame 12. The gear 50 is driven by a gear 52 rotatably mounted on the base frame 8. The gear 52 can be driven by a reversible motor 54, as shown in FIG. 2 mounted directly to the base frame 8. The gear 52 can also be driven by a power source external to the base frame 8, such as through a shaft 56 shown in FIG. 3. The motor 54 can be an electric motor, a hydraulic motor or pneumatic motor.

Figure 7:
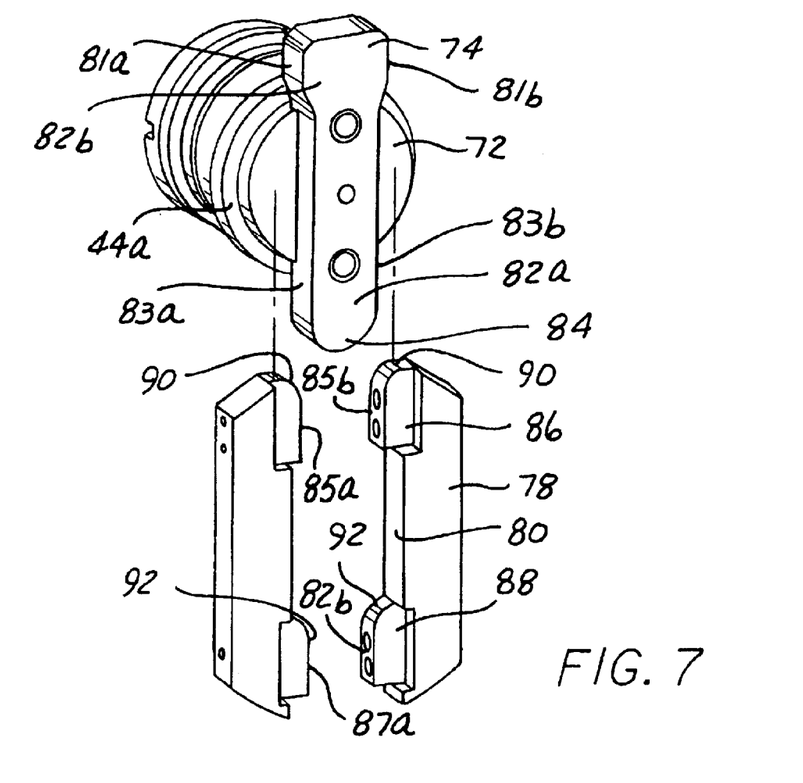
FIG. 7 is a detailed perspective view of a coupling for driving the frame in rotation with a motor when the trunnion is operably engaged with the yoke.
Figure 8:
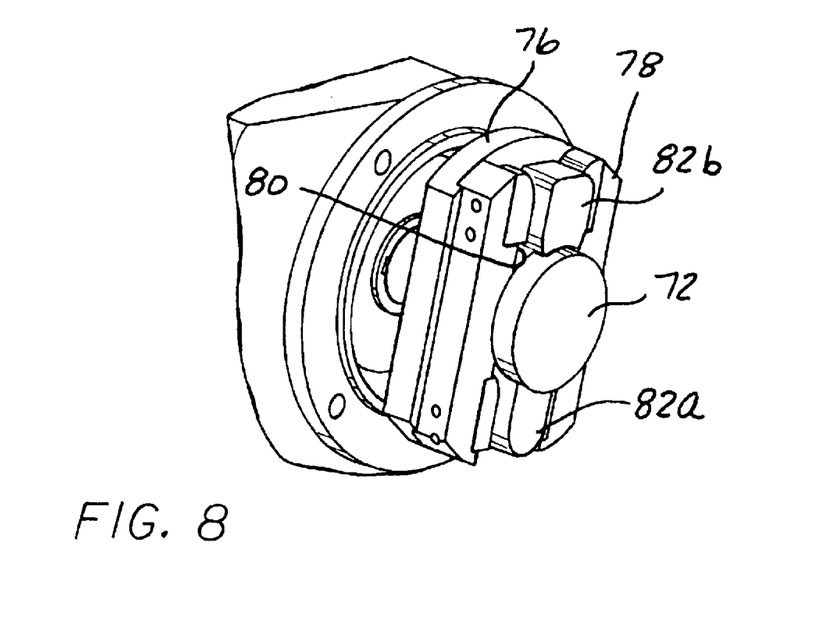
FIG. 8 is a detailed perspective view of the alignment pin portion of the coupling engaged within the alignment slot portion of the coupling.

FIG. 7 illustrates a coupling in an uncoupled position with the alignment pin or key spaced from the alignment slot, keyway or groove. FIG. 8 illustrates the coupling in a coupled position with the key engaged within the corresponding keyway. The rotary drive 16 can include a stub end 72 extending from the guide spool 44a portion of the trunnion. The stub end 72 can be circular, as shown in FIG. 7, or shaped as a rectangle, polygon, or can be variable in cross section. The stub end 72 preferably extends along a center axis of the guide spool 44a and away from the pivotal frame 12. As shown in FIG. 7, the stub end 72 includes a key 74 at an end opposite from the guide spool 44a. The stub end 72 defines a first portion of a mating coupling 76. Another portion of the mating coupling 76 has opposing walls 78 defining a complementary slot 80 for receiving the key 74, as shown in FIG. 8. The coupling 76 connects the motor 54 to the trunnion of the pivotal frame 8. The walls 78 of the second portion of the coupling 76 form a slot or groove 80, so that the key 74 is insertable in the groove 80. Preferably, the key 74 slides vertically into the groove 80, engaging the coupling 76 as the frame 12 is lowered into the base frame 8.

The stub end 72 can include at least one tab 82a projecting radially from the end 72. The key 74 preferably includes two tabs 82a and 82b. The opposite sidewalls 81a, 81b, 83a, 83b of tabs 82a and 82b engage alignment surfaces 85a, 85b, 87a, 87b respectively to coaxially align the axis of the trunnion 44a with the axis of the drive portion of the coupling 76. The engaged surfaces transfer rotational movement of the shaft to the frame 12. The tabs 82a and 82b preferably extend radially from the end 72 approximately 180° apart to ensure that the tabs 82a and 82b do not interfere with the end 72 sliding into the groove 80. The tabs 82a and 82b can be formed to promote the insertion of the end 72 into the groove 80 and also promote a relatively tight fit between the end 72 and the groove 80.

In operation, as the frame 12 is lowered into the trunnion 14, the tab 82a is inserted in the groove 80 first, so the tab 82a preferably is narrower than the groove 80 to prevent excessive wear by sliding contact with surfaces 85a, 85b. Tab 82a can also include a tapered end 84 to further promote insertion. It is preferred that a relatively tight fit exists between the end 72 and the groove 80 to promote continuous reciprocating rotary action between the coupling 76 and the end 72. To facilitate both ease of insertion and a tight fit, the tab 82a can be narrower than tab 82b. As the frame 12 is lowered into the base frame 8, the weight of the frame 12 can promote the complete insertion of the stub end 72, including the wide tab 82b, into the groove 80. The walls 78 can also include first guide means 86 and second guide means 88 to promote the insertion of the end 72 in the groove 80 and also promote a tight fit between the end 72 and the groove 80. The first guide means 86 can be positioned at the end of the groove 80 in which the end 72 is first inserted. The first guide means 86 can include a tapered surface 90. The first guide means 86 can be positioned on both sides of the groove 80 and the tapered surface 90, on both first guide means 86, can act to narrow the groove 80. The surface 90 can engage the end 84 to promote insertion of the end 72 in the groove 80. The gap between the first guide means 86 positioned on opposing sides of the groove 80 can be equivalent to the width of the tab 82b to create a tight fit between the end 72 and the groove 80. The second guide means 88 can be positioned on opposing sides of the groove 80 at a lower end of the groove 80. The second guide means 88 can be positioned on both sides of groove 80 and can include tapered surfaces 92 to guide the tab 82a, as well as the stub end 72, during insertion into the groove 80. The distance between the second guide means 88 can be equivalent to the width of the tab 82a to promote a tight fit between the end 72 and the groove 80.

A workpiece 22 is positioned on the first face 18 of the frame 12. The workpiece 22 is retained by one or more workpiece retaining devices, such as a nesting fixture 26, a locating pin 28, and/or a clamp 30. As the workpiece 22 is being positioned on the first face 18, a workpiece 24 positioned on the second face 20 of the frame 12 is processed. For example, one or more robots 58 can perform a welding operation on the workpiece 24. When the processing of the workpiece 24 is complete, the frame 12 is rotated by the rotary drive 16 and the workpiece 24 is removed from the second face 20. When the frame 12 is rotated, the first face 18 is positioned to face the robot 58. The workpiece 22 is then processed. As the workpiece 22 is processed, a new workpiece is loaded onto the second face 20.

The trunnion mountable fixture 10 can also include an electric controller 68. As shown in FIG. 2, the controller 68 can be coupled to the motor 54, robot 58, lifting device 70, or any combination thereof. The controller 68 can control the rotation of the frame 12*a*, movement of robots between adjacent workstations, and the exchange of one frame 12 for another during changeover of a workstation. The controller 68 can control the motor 54 to rotate the frame 12*a* in response to a signal that the robot has finished work, or after a predetermined period of time has passed, or in response to a release button engaged by the operator loading the opposite side of the frame from the welding robot. The predetermined period of time can correspond to a cycle time for completing a processing operation on a workpiece or an automated loading cycle time for a new workpiece to be processed.

Figure 4:
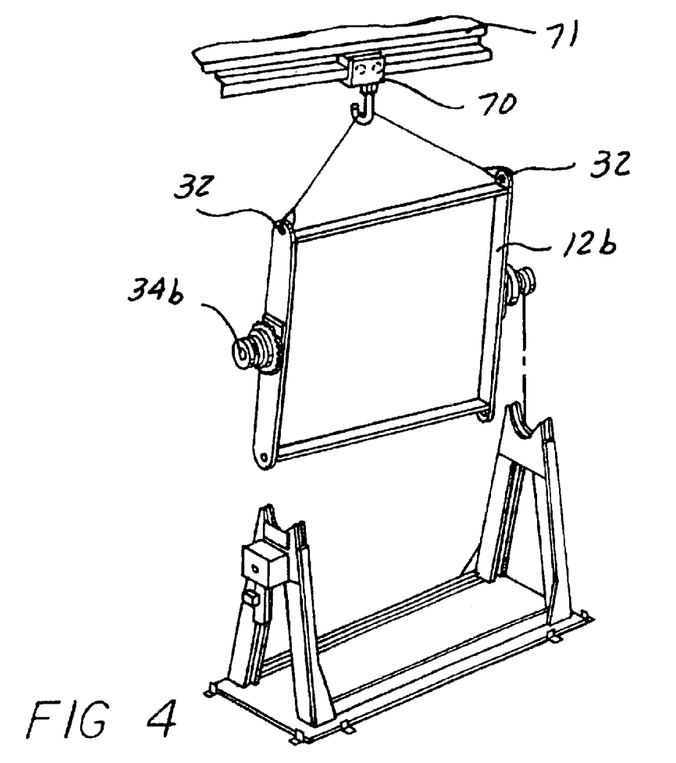
FIG. 4 is a perspective view showing the trunnion of a frame being lifted out of the yoke.

When a new workpiece configuration is to be processed, the frame 12 can be lifted out of the cradle portion of base frame 8. As shown in FIG. 4, a lifting device 70 can be attached to the frame 12*b* at the rings 32. The frame 12*b* can be lifted up and out of the cradle or yoke and a second frame (not shown), having different workpiece retaining devices, can be lowered into the cradle or yoke of the base frame 8. The lifting device 70 can include an overhead rail 71 to move the frame 12*b* to a storage location. If the electric and/or pneumatic and/or hydraulic connections are made through manual connections, or quick connect couplings, adjacent aperture 34*b* of the frame 12*b*, those connections can be disconnected before the frame 12*b* is lifted out of the cradle, and reconnected to the new frame after the replacement frame is placed in position.

Figure 5:
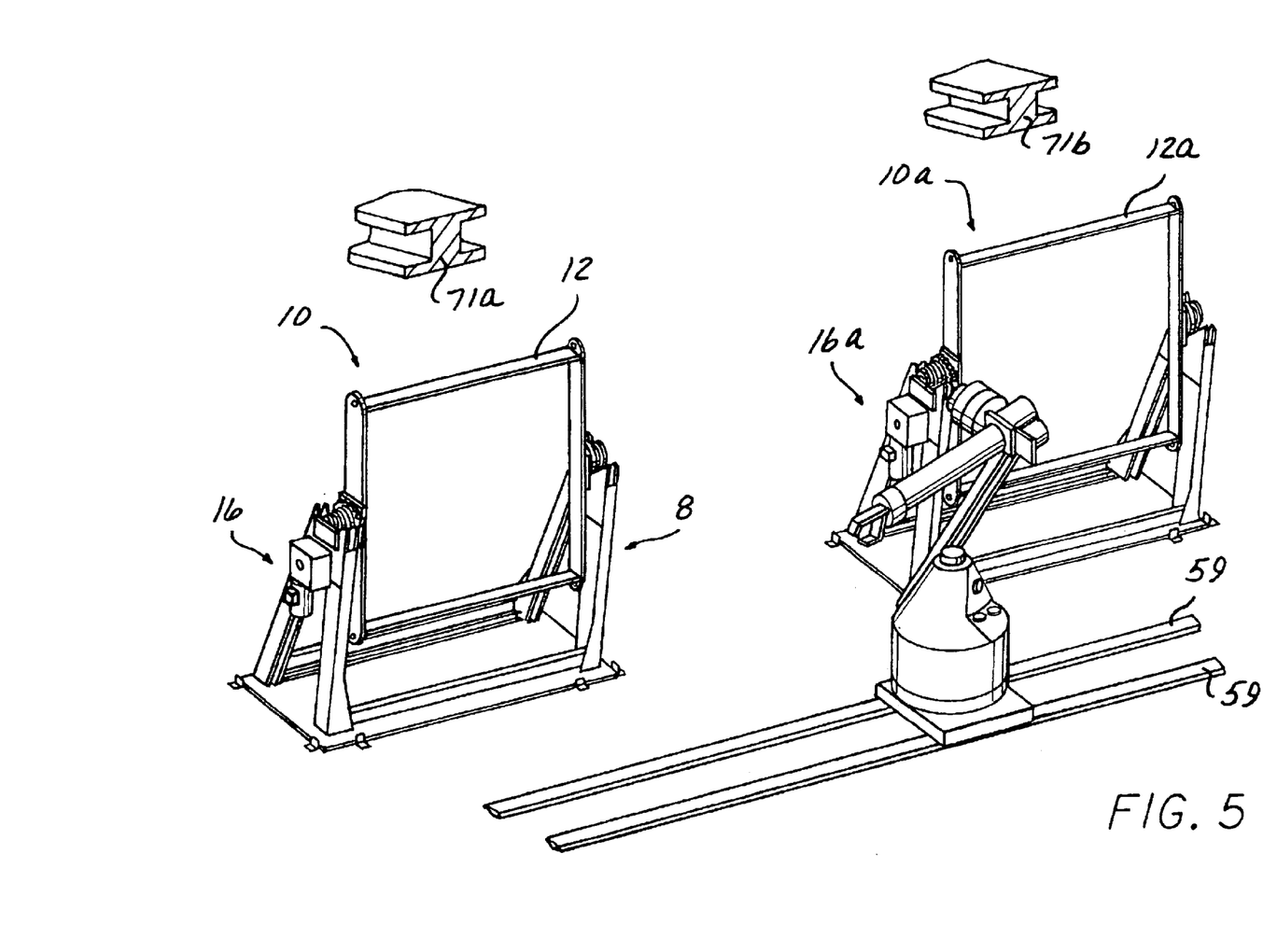
FIG. 5 is showing two trunnion mountable fixtures arranged side by side.

A dual workstation can be configured to include two trunnion mounted fixtures operating side by side. As shown in FIG. 5, a trunnion mountable fixture 10, according to the present invention, is positioned adjacent a trunnion mountable fixture 10*a*. It can be desirable to position two trunnion mountable fixtures adjacent to each other at a dual workstation, for example, to increase the efficiency of the one or more processing robots 58*a*. Each robot 58*a* can perform a processing operation, such as a welding operation, on a workpiece positioned on the trunnion mountable fixture 10 and then move to the trunnion mountable fixture 10*a* to perform a second processing operation. The robot 58*a* can perform processing operations continuously regardless of the time required to position workpieces on the trunnion mountable fixtures 10 and 10*a*, or the time required to change over the frame 12 in the idle workstation. The trunnion mountable fixture 10 and trunnion mountable fixture 10*a* can be identical or can be different. It can be desirable to have identical trunnion mountable fixtures positioned adjacent to each other at a workstation if, for example, a significant quantity of similarly configured workpieces are to be processed through the workstation, and loading times are slower than the robot processing time. On the other hand, it can be desirable to have differently configured fixtures 10 and 10*a* if, for example, different workpiece configurations are to be processed at the workstation concurrently or the time required for changeover of frames would otherwise require robot down time. The trunnion mountable fixture 10 can be operable to engage a first workpiece configuration and trunnion mountable fixture 10*a* can be operable to engage a second workpiece configuration.

Figure 6:
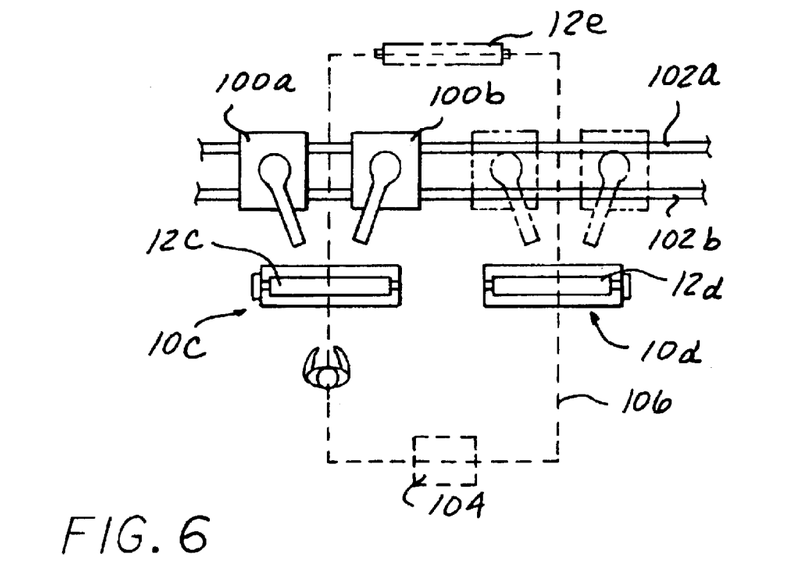
FIG. 6 is a schematic plan view of first and second trunnion workstations with an overhead changeover system and multiple robots moveable between the workstations.

A workstation can include multiple robots 100*a* and 100*b* and multiple trunnion mountable fixtures 10*c* and 10*d*. As is shown in FIG. 6, a workstation can include a trunnion mountable fixture 10*c* positioned adjacent to a trunnion mountable fixture 10*d*. A plurality of robots 100*a* and 100*b* can be mounted on tracks 102*a* and 102*b* to move between the trunnion mountable fixtures 10*c* and 10*d*. The workstation can include an overhead fixture exchanging device 104 operable to follow a path defined by an overhead rail 106, shown schematically in FIG. 6. A workpiece can be mounted on the trunnion mountable fixture 10*c* where processing robots 100*a*, 100*b* perform processing operations on the workpiece. Contemporaneously, the device 104 can remove a frame 12*c* from the trunnion mountable fixture 10*c*. The device 104 can follow the overhead rail 106 and move the frame 12*c* away from the workstation. The device 104 can retrieve a different frame 12*e*, shown schematically, and move the frame 12*e* to the trunnion mountable fixture 10*c*. When the frame 12*e* is mounted on the trunnion mountable fixture 10*c*, the processing robots 100*a* and 100*b* can move along the rails 102*a* and 102*b* to begin processing operations at the fixture 10*c*. The position of the robots 110*a* and 100*b* is shown schematically in FIG. 6. After the frame 12*e* has been mounted on the fixture 10*c*, the device 104 can move to the fixture 10*d* to remove a frame 12*d*. It can be desirable to have a workstation having multiple fixtures, multiple robots and an overhead rail delivery system to increase the efficiency of the workstation.

Figure 9:
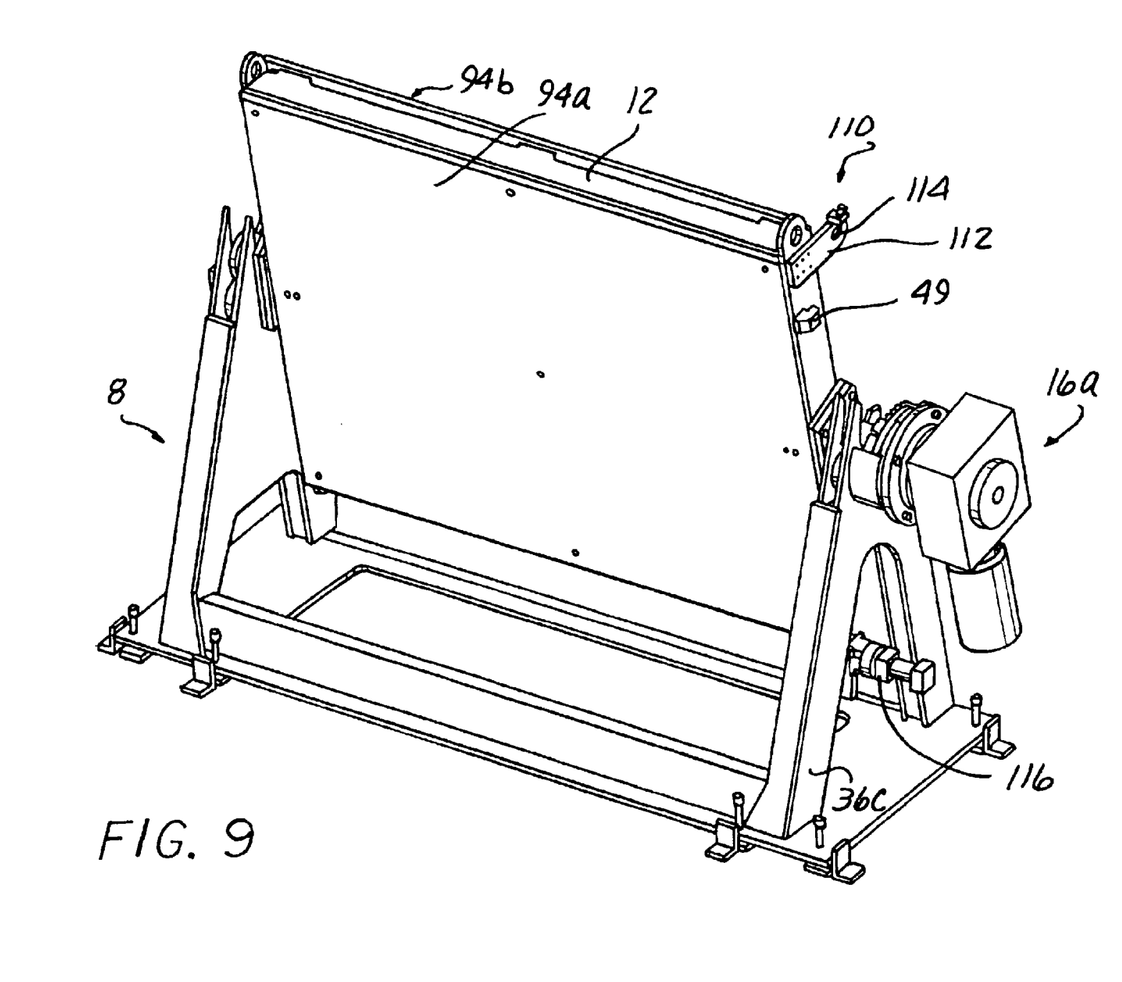
FIG. 9 is a perspective view of a trunnion supported frame having plates and locking means.

The trunnion mountable fixture 10 can include a frame locking means 110 for maintaining the frame in a desired position relative to the base frame 8. The frame locking means 110 can include a member 112 as shown in FIG. 9, including an aperture 114. The member 112 is mountable to the frame through bolts, fasteners or welding. The member 112 is mounted to the frame 12 to expose the aperture 114. The frame locking means 110 also includes a reciprocal pin 116 moveable between an extended position and a retracted position. The pin is positioned within an extension means 118 mountable to the base frame 8. The extension means 118 can extend and retract the pin 116. The extension means 118 can be electrically, hydraulically or pneumatically powered. The pin 116 is insertable in the aperture 114. The pin 116 can be extended to engage through the aperture 114 and loosely lock the frame 12 in a desired rotational position and can retract from the aperture 114 to unlock the frame 12, for example, in response to an operator pressing one or more safety buttons allowing rotation of the frame from a safe distance. The frame locking means can include a plurality of members 112 engageable with the single pin 116 to lock the frame 12 in a plurality of different positions, such as with the first face directed toward the welding robots and/or the second face of the pivotal frame facing the welding robots. To ensure an accurate and repeatable position for each pivotal frame mounted on the base frame, the alignment key engages the alignment slot or keyway to repeatably position the axis of rotation for each frame. Preferably, the motor 54 drives the pivotal frame 12 into engagement with a positioning stop 49 shown in FIG. 9 mounted on the base frame 8 and maintains low torque on the pivotal frame 12 to maintain the known predefined position or orientation required by robots for automated processes, like welding.

Referring again to FIG. 5, two trunnion mountable fixtures 10 and 10*a* are shown side by side. Above each fixture is a rail 71*a* and 71*b*, respectively. Each rail can define a path of movement for a lifting device. A lifting device can move along one of the paths formed by the rails 71*a* and 71*b* and be positioned above one of the trunnion mountable fixtures. Each of the trunnion mountable fixtures 10 and 10*a* can be configured similarly or differently. For example, the trunnion mountable fixture 10 can support a first configuration of workpiece during processing operations while the fixture 10a supports a second configuration of workpiece. The robot 58a can be programmed to perform different processing operations on different workpieces mounted at the different fixtures 10 and 10a. A controller can communicate with the robot 58a, rotating means 16 and rotating means 16a. The controller can also communicate with lifting devices moving along rails 71a and 71b. Fixtures 10 and 10a can include frames 12 and 12a, each frame having a sensor for sending the presence of a workpiece. The sensor can communicate with the controller that a workpiece is being supported by the frame. In operation, the controller can move the robot 58a to the fixture 10 when the sensor on the frame 12 emits a signal that the frame is supporting a workpiece. The robot 58a can move to the fixture 10 and perform a predetermined processing operation on the workpiece supported by the frame 12. The processing operation can be a welding operation or a metal forming operation. When the robot 58a has completed the processing operation it can emit a signal to the controller. The controller can then engage the rotating means 16 to rotate the frame 12 and position a second workpiece with respect to the robot 58a to repeat the processing operation. Alternatively, the controller can move the robot 58a to the fixture 10a to perform a processing operation on a different workpiece supported by the frame 12a. Contemporaneously, the controller can cause the rotating means 16 to rotate the frame 12 while the robot 58a is moving to the fixture 10a. At some point in the production cycle, a differently configured workpiece may be processed. A different frame may be required to support the differently configured workpiece. When the last workpiece has been processed at the frame 12, the controller can control a lifting device moving along the path 71a to move to the fixture 10 and remove the frame 12 from the base 8. While the robot 58a is completing a processing operation at fixture 10a the frame 12 can be replaced with a different frame (not shown). The same changeover can be completed at the fixture 10a while the robot 58a is performing a processing operation at the fixture 10. The controller can control the operations of the rotary drive 16 and 16a, the movement of the robot 58a and movement of lifting devices moving along rails 71a and 71b to increase the efficiency of the workstation. The robot 58a can move along rails 59.

Referring now to FIG. 9, the invention can include a controller communicating with the drive 16a and the pin 116. The invention can also include a position sensor to determine the position of the frame with respect to the base 8. The frame 12 can also include a sensor for sensing the presence of a workpiece supported by the frame 12. The controller can also communicate with the sensor. When the frame is rotated into a predetermined position, the controller can control the pin 116 to pierce the aperture 114 to maintain the frame in a desired position. When a processing operation has been completed by a robot (not shown) the robot can send a signal to the controller and the controller can move the pin out of the aperture 114. The controller can then control the rotary drive 16a to rotate the frame as desired. A sensor mounted on the frame 12 can detect the presence of a workpiece and send a signal to the controller. If the signal is not received by the controller, the controller can maintain the position of the frame until a workpiece is sensed by the sensor. The means for communicating between the sensor and the controller can pass through the aperture in the center of the frame. The stop 49, shown positioned on the frame 12, can also be positioned on the support member 36c.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An apparatus for supporting at least one workpiece during a processing operation comprising:
    a base;
    a frame rotatably engageable with the base to support the at least one workpiece, the frame defining at least two workpiece supporting surfaces;
    means for rotating the frame with respect to the base; and
    coupling means disposed between the frame and the rotating means to communicate rotation from the rotating means to the frame, the coupling means including a key portion defined by the frame and a groove portion defined by the rotating means.

2. The apparatus of claim 1, wherein the frame further comprises:
    a plurality of frames selectively engageable with the base, each frame operable to selectively support at least one differently configured workpiece to be processed.

3. The apparatus of claim 1 further comprising:
    means for removing the frame with respect to the base.

4. The apparatus of claim 3, wherein the removing means further comprises:
    a lifting device moveable along an overhead path for releasibly engaging the frame and for removing the frame from the base; and
    an overhead rail supporting the lifting device and defining the path for exchanging the frame of one structural configuration with a substitute frame of a different structural configuration for processing workpieces of different structural configurations.

5. The apparatus of claim 3 wherein the removing means further comprises:
    eyelets on at least two corners of the frame.

6. The apparatus of claim 1 wherein the frame further comprises:
    workpiece engaging means selected from the group consisting of clamps, locating pins and nesting fixtures.

7. An apparatus for supporting at least one workpiece during a processing operation comprising:
    a base;
    a frame rotatably engageable with the base to support the at least one workpiece, the frame defining at least two workpiece supporting surfaces, wherein the frame includes workpiece engaging means selected from the group consisting of clamps, locating pins and nesting fixtures, at least one aperture disposed on an axis of rotation of the frame for communicating power to the workpiece engaging means; and
    means for rotating the frame with respect to the base.

8. An apparatus for supporting at least one workpiece during a processing operation comprising:
    a base including a plurality of support members spaced apart from one another and a plurality of cross members slidably engageable with respect to each other and engageable with at least one of the support members, the support members moveable with respect to each other in response to sliding engagement of the cross members;

a frame rotatably engageable with the base to support the at least one workpiece, the frame defining at least two workpiece supporting surfaces; and means for rotating the frame with respect to the base.

9. An apparatus for supporting at least one workpiece during a processing operation comprising:

a base;

a frame rotatably engageable with the base to support the at least one workpiece, the frame defining at least two workpiece supporting surfaces;

a plurality of rollers associated with the base for supporting the frame during rotation; and means for rotating the frame with respect to the base.

10. The apparatus of claim 1 wherein the rotating means further comprises:

drive means selected from the group consisting of an electric motor, a hydraulic motor and a pneumatic motor.

11. The apparatus of claim 1 further comprising:

at least one robot for performing a processing operation on the workpiece supported by the frame.

12. The apparatus of claim 1 further comprising:

a second base spaced from the base;

a second frame rotatably engageable with the second base for supporting at least one second workpiece, the second frame defining at least two second workpiece supporting surfaces for supporting one of at least two second workpieces of different structural configuration to be processed; and means for rotating the second frame with respect to the second base to bring a desired second workpiece supporting surface into a ready position for receiving a particular structural configuration of second workpiece to be processed.

13. The apparatus of claim 12 further comprising:

at least one robot moveable along a second path between the base and the second base to perform a processing operation with respect to a workpiece supported by the frame and to perform a second processing operation with respect to a second workpiece supported by the second frame.

14. The apparatus of claim 13, wherein the at least one robot further comprises:

two robots for selectively performing processing operations on workpieces supported by the frame and the second frame, such that the two robots are movable along the second path between the frame and the second frame allowing exchange of a processed workpiece for an unprocessed workpiece at whichever frame is idle, while the two robots continue processing a workpiece at whichever frame is loaded with a workpiece at the ready position.

15. The apparatus of claim 13 further comprising:

at least one rail defining the second path of travel for the at least one robot between the frame and the second frame, such that the at least one robot is movable along the second path between the frame and the second frame allowing exchange of a processed workpiece for an unprocessed workpiece at whichever frame is idle, while the at least one robot continues processing a workpiece at whichever frame is loaded with a workpiece at the ready position.

16. The apparatus of claim 1 further comprising:

a sensor mountable with respect to the frame for sensing a workpiece supported by the frame.

17. The apparatus of claim 1 further comprising:

means for stopping rotation of the frame in a predetermined position with respect to the base.

18. An apparatus for supporting at least one workpiece during a processing operation comprising:

a base including a plurality of support members spaced apart and a plurality of cross members slidably engageable with respect to each other and engageable with at least one of the support members, the support members moveable with respect to each other in response to sliding engagement of the cross members and defining at least two cradles;

a frame rotatably engageable with the base and removable with respect to the base and having a plurality of frame members defining at least two workpiece supporting surfaces and at least two trunnions disposed on opposite sides of the frame, each trunnion including a spool configured to correspond to one of the cradles and prevent lateral movement of the frame with respect to the base, the frame also including at least one workpiece engaging means for supporting a workpiece, the frame also including an aperture disposed on an axis of rotational of the frame for communicating power to the at least one workpiece engaging means, the frame also includes a sensor for a sensing workpiece supported the frame and emitting a signal;

means for rotating the frame with respect to the base;

means for removing the frame with respect to the base including a lifting device moveable along a path, the path defined by at least one overhead rail;

at least one robot for performing a processing operation on the workpiece; and control means for controlling the rotating means and the movement of the lifting device and the robot.

19. The apparatus of claim 9, wherein the frame further comprises:

a plurality of frames selectively engageable with the base, each frame operable to selectively support at least one differently configured workpiece to be processed.

20. The apparatus of claim 9 further comprising:

means for removing the frame with respect to the base.

* * * * *

UNITED STATES PATENT AND TRADEMARK OFFICE
CERTIFICATE OF CORRECTION

PATENT NO. : 6,732,852 B2
DATED : May 11, 2004
INVENTOR(S) : Velibor Kilibarda et al.

It is certified that error appears in the above-identified patent and that said Letters Patent is hereby corrected as shown below:

Title page,
Item [12], please delete "Kilabards" and insert -- Kilibarda --.
Item [75], Inventors, after "Inventors: Velibor" please delete "Kilabards" and insert -- Kilibarda --.

Signed and Sealed this

Twenty-eighth Day of September, 2004

JON W. DUDAS
*Director of the United States Patent and Trademark Office*